2,871,258
BRANCHED CHAIN DIAMMONIO ESTERS

John Hidalgo, San Francisco, and Arthur Rodney Williams and Isaac Frederick Halverstadt, Berkeley, Calif., assignors to Cutter Laboratories, Inc., Berkeley, Calif., a corporation of California No Drawing. Application October 14, 1954
Serial No. 462,401

8 Claims. (Cl. 260—482)

This invention relates to organic compounds, and is more particularly concerned with certain esters containing two ammonio groups thereon and wherein the hydrocarbon portion of the alcohol or acid moiety of said ester is a branched chain.

More specifically, the compounds of the present invention have the following formula:

$$\underset{R''\text{-anion}}{\overset{R}{\underset{|}{R'-N}}}-C_nH_{2n}-\overset{O}{\underset{||}{C}}-O-C_mH_{2m}-\underset{R_1''\text{-anion}}{\overset{R_1}{\underset{|}{N}}}-R_1'$$

wherein R, R', R'', R$_1$, R$_1$', and R$_1$'' are lower-alkyl groups containing up to six carbon atoms, wherein $n$ and $m$ are integers from one through six, inclusive, wherein either of the C$_n$H$_{2n}$ and C$_m$H$_{2m}$ groups are branched chains, and wherein the anion is a salt-forming, non-toxic acid anion.

It will be noted that the compounds of the present invention are bis quaternaries. These materials have exhibited an excellent degree of hypotensor activity in preliminary pharmacological testing, when tested in rats, rabbits, dogs and cats. This activity apparently is accomplished by ganglionic blockage. In direct contrast to closely related compounds, where no branched chain is present in the acid or alcohol moiety, and which show a relatively short time of activity, the materials of the present invention exhibit a relatively prolonged hypotensor activity of moderate to powerful degree. Further, when tested in experimental animals, the compounds of the present invention exhibit sufficient cholinergic activity to prevent intestinal stasis, and anhydrosis, the common disagreeable side-effects of the commercially available hypotensor drugs. In view of the above, these compounds have exhibited a potential value in the treatment of chronic hypertension, at least in animals.

The compounds of the present invention have been prepared by two different methods, both of which have been satisfactory. One method consists of providing an appropriate branched-chain ester substituted on both the alcohol and acid moiety by a tertiary amino grouping. This type of ester is quaternized with an appropriate alkyl halide or other alkyl salt quaternizing material. Alternatively, the compounds may be prepared by providing a halo-substituted, ammonio-substituted branched-chain ester and reacting this material with a tertiary amine.

Certain of the materials utilized as intermediates in the preparation of the compounds of the present invention are novel. Using the first method, the starting material has the formula:

$$\overset{R}{\underset{|}{R'-N}}-C_nH_{2n}-\overset{O}{\underset{||}{C}}-O-C_mH_{2m}-\overset{R_1}{\underset{|}{N}}-R_1'$$

wherein R, R', R$_1$, R$_1$', $n$ and $m$ have the hereinbefore assigned values. This type of material may be prepared by the reaction of a dialkylamine with a tertiary-amino-alkyl ester of methacrylic acid or other ester of other appropriate unsaturated acids in the presence of a polymerization inhibitor. Suitable polymerization inhibitors such as N-phenyl-2-naphthylamine are known in the art. The reaction is accomplished by the contact interaction of the reactants, preferably below about fifty degrees centigrade, if in the presence of atmosphere, or at higher temperatures if in a sealed tube. Reaction time is inversely affected by the temperature, that is, the higher the temperature the shorter the reaction period required. At room temperature, a number of days will be necessary, while at the higher temperatures, less time is needed. Purification can be readily accomplished by distillation under reduced pressure.

To prepare the compounds of the present invention this type of branched chain ester substituted by two tertiary amino groups is reacted with an appropriate quaternizing material such as, for example, methyl chloride, ethyl bromide, propyl iodide, butyl nitrate, pentyl sulfate, et cetera. This quaternizing material will have the formula R'' anion or R$_1$'' anion wherein R'', R$_1$'' and anon have the hereinbefore assigned values. This reaction occurs readily upon contact of the reactants in a suitable solvent, such as, for example, acetone, chloroform, methanol, ether, acetonitrile, or mixtures of these. A substantial molecular excess of the quaternizing material is usually employed and the reaction occurs readily at room temperature. With a proper selection of solvent, the desired product will crystallize, or it can be separated by removal of the solvent.

A second method for preparing the compounds of this invention involves the provision of a material having the formula:

$$X-C_nH_{2n}-\overset{O}{\underset{||}{C}}-O-C_mH_{2m}-\underset{R_1''\text{-anion}}{\overset{R_1}{\underset{|}{N}}}-R_1'$$

wherein R$_1$, R$_1$', R$_1$'', $n$ and $m$ have the hereinbefore assigned values, and X is chlorine, bromine or iodine. This type of ester may be readily prepared as is specifically described in the following preparations. This type of material is reacted with a tertiary amine having the formula:

$$\overset{R}{\underset{\underset{R''}{|}}{R'-N}}$$

wherein R, R', and R'' have the hereinbefore assigned values. The reaction is readily accomplished by the contact interaction of the reactants in the presence of a suitable solvent, such as, for example, chloroform, acetone, dioxane, methanol, acetonitrile, et cetera, or mixtures of these. A substantial excess of the tertiary amine is usually employed and as in the first method the reaction occurs readily at room temperature. Again, with a proper selection of solvent, the product will crystallize, or it can be separated by removal of the solvent. Purification of the compounds can be accomplished by recrystallization.

The anion portion can be any non-toxic anion, such as, for example, chloride, bromide, iodide, nitrate, picrate, citrate, et cetera. Conventional anoion exchange techniques may be employed to vary the anion.

The compounds of the present invention are crystalline solids, generally quite soluble in water.

The following preparations are given to provide methods for preparing intermediates useful in the preparation of certain compounds.

PREPARATION 1

*2-trimethylammoniobutanol iodide*

To a solution of 35.0 grams (0.88 mole) of sodium hydroxide, and 36.0 grams (0.40 mole) of 2-amino-1-butanol in 250 milliliters of methanol, cooled in an ice bath, was added 187 grams (1.31 moles) of methyl iodide. After the exothermic reaction subsided, the solution was heated under reflux for four hours. An additional 75 grams (0.53 mole) of methyl iodide and 300 milliliters of acetone were added and refluxing continued for three hours. No solid separated on standing at room temperature overnight, so the solution was heated under reflux for seven hours, the solvent evaporated, and the semisolid residue was dissolved in 1000 milliliters of refluxing acetone, 500 milliliters of ether was added, and the solution was placed in an ice chest. After cooling overnight, crystals were obtained, which, after recrystallization from methanol-ether, gave 31.5 grams (thirty percent of the theoretical yield) of 2-trimethylammoniobutanol iodide, as colorless crystals, melting at 223–226 degrees centigrade.

Analysis.—Calculated for $C_7H_{18}INO$: I, 48.98. Found: I, 49.40.

In a manner similar, trialkylammonioalkanols may be prepared by substituting appropriate starting materials.

PREPARATION 2

2-trimethylammoniobutyl 3-iodopropionate iodide

A mixture of 15.0 grams (0.058 mole) of 2-trimethylammoniobutanol iodide and 15.0 grams (0.069 mole) of 3-iodopionyl chloride was placed in a 100-milliliter Erlenmeyer flask, protected from moisture with a drying tube. The mixture became warm and set to a homogeneous melt in fifteen minutes. The reaction was completed by warming on a steam bath for one hour. After digesting with three fifty-milliliter portions of ether to remove excess 3-iodopropionyl chloride, the brown residue was recrystallized from 25 milliliters of methanol to give a mass of pale yellow crystals. After one more recrystallization from methanol, there was obtained 12.6 grams of colorless crystals, melting at 127 degrees centigrade. Reworking of the mother liquors gave an additional 6.7 grams of crystals, melting at 125–127 degrees centigrade for a total yield of 19.3 grams (75 percent of the theoretical yield) of 2-trimethylammoniobutyl 3-iodopropionate iodide.

Analysis.—Calculated for $C_{10}H_{21}I_2NO_2$: C, 27.23; H, 4.80; I, 57.54. Found: C, 26.46; H, 4.70; I, 57.87.

PREPARATION 3

1-methyl-2-trimethylammonioethyl 3-iodopropionate iodide

In a flask equipped with a drying tube was placed 12.25 grams (0.05 mole) of 1-methyl-2-trimethylammonioethanol iodide [prepared by the method of Schultz and Spraque, J. Am. Chem. Soc. 70, 48 (1948)] and 12.3 grams (0.056 mole) of 3-iodopropionyl chloride. The flask was heated gently with a free flame until the mixture set to a homogeneous melt, and was then heated on a steam bath for one hour. After digesting the resultant red-brown oil with three fifty-milliliter portions of ether, the oil was dissolved in fifty milliliters of refluxing acetone, filtered and placed in an ice chest. After cooling overnight there were obtained colorless crystals. These were recrystallized from methanol-ether to give 13.5 grams (63 percent of the theoretical yield) of 1-methyl-2-trimethylammonioethyl 3-iodopropionate iodide, as colorless crystals, melting at 117–118 degrees centigrade.

Analysis.—Calculated for $C_9H_{19}I_2NO_2$: I, 59.45. Found: I, 59.24.

PREPARATION 4

2-methyl-2-trimethylammoniopropyl 3-iodopropionate iodide

A mixture of 12.2 grams (0.047 mole) of freshly ground 2-methyl-2-trimethylammoniopropanol iodide [prepared by the method of Rosnati, Gazz. Chim. Ital. 80, 663 (1950)] and 12.3 grams (0.056 mole) of 3-iodopropionyl chloride was heated with a free flame until a homogeneous red oil was obtained. The flask was then heated on a steam bath for one hour. The oil was shaken with three fifty-milliliter portions of ether. This oil gave an amorphous solid, melting at 178–182 degrees centigrade, from acetone, and the solid gave 7.8 grams of colorless crystals melting at 182–183 degrees centigrade from 35 milliliters of 2B absolute ethanol. Rework of the mother liquors and repeated recrystallizations of the first crop from 2B absolute alcohol gave 6.2 grams (thirty percent of the theoretical yield) of 2-methyl-2-trimethylammoniopropyl 3-iodopropionate iodide, as colorless crystals, melting at 181 degrees centigrade.

Analysis.—Calculated for $C_{10}H_{21}I_2NO_2$: N, 3.18. Found: N, 3.21.

PREPARATION 5

2-dimethylaminoethyl 3-dimethylamino-2-methylpropionate

A solution of 4.7 grams (0.104 mole) of dimethylamine and a trace of N-phenyl-2-naphthylamine inhibitor in 15.72 grams (0.100 mole) of 2-dimethylaminoethyl methacrylate was allowed to stand at room temperature for one week. Distillation of the reaction solution gave a yield of 16.57 grams (82 percent of the theoretical yield) of 2-dimethylaminoethyl 3-dimethylamino-2-methylpropionate as a colorless oil, boiling at 68–71 degree centigrade at three millimeters of mercury pressure absolute.

Analysis.—Calculated for $C_{10}H_{22}N_2O_2$: N, 13.85. Found: N, 13.38.

PREPARATION 6

2-diethylaminoethyl 3-diethylamino-2-methylpropionate

A solution of 7.4 grams (0.10 mole) of diethylamine and 0.5 gram of N-phenyl-2-naphthylamine inhibitor in 12.15 grams (0.065 mole) of diethylaminoethyl methacrylate in a sealed tube was heated at 107 degrees centigrade for sixteen hours and at 135 degrees centigrade for fifty hours. Distillation of the reaction mixture gave a crude yield of 11.62 grams (69 percent of the theoretical yield) boiling at 100–135 degrees centigrade at six millimeters; refractionation gave a recovery of 65 percent (overall yield 45 percent of the theoretical) of 2-diethylamino-ethyl 3-diethylamino-2-methylpropionate, as a colorless oil, boiling at 109–116 degrees centigrade at two millimeters of mercury pressure absolute.

Analysis.—Calculated for $C_{14}H_{30}N_2O_2$: N, 10.84. Found: N, 10.48.

In a manner similar to that of the foregoing preparations, other intermediates for the compounds of this invention may be prepared by substituting other alkyl groups, such as, for example, propyl, isobutyl, butyl, pentyl, et cetera, for the methyl and ethyl nitrogen substituents and other alkylene groups by an appropriate selection of starting materials.

The following examples are given to illustrate methods whereby compounds of the present invention may be prepared; however, they are not to be construed as limiting.

EXAMPLE 1

2-trimethylammoniobutyl 3-trimethylammoniopropionate diiodide

A mixture of 10.0 grams (0.023 mole) of 2-trimethylammoniobutyl 3-iodopropionate iodide and five grams (0.085 mole) of trimethylamine in fifty milliliters of chloroform was vigorously shaken and allowed to stand at room temperature for 24 hours. The chloroform was decanted and the colorless solid was recrystallized from fifty milliliters of methanol to give 8.7 grams (77 percent of the theoretical yield) of 2-trimethylammoniobutyl 3-trimethylammoniopropionate diiodide as colorless crystals, melting at 187–188 degrees centigrade.

Analysis.—Calculated for $C_{13}H_{30}I_2N_2O_2$: C, 31.21; H, 6.05; I, 50.75. Found: C, 31.54; H, 6.04; I, 50.08.

Example 2

1-methyl-2-trimethylammonioethyl 3-trimethylammoniopropionate diiodide

A mixture of 2.0 grams (0.0047 mole) of 1-methyl-2-trimethylammonioethyl-3-iodoproprionate iodide, and 1.5 gram (0.025 mole) of trimethylamine in fifteen milliliters of chloroform was shaken vigorously for five minutes, at which time the solid material had changed to a clear, colorless oil. After standing at room temperature overnight, the oil crystallized. The chloroform was decanted, the crystal mass washed by decantation with chloroform, and the material recrystallized twice from ten milliliter portions of methanol giving 2.0 grams (88 percent of the theoretical yield) of 1-methyl-2-trimethylammonioethyl 3-trimethylammoniopropionate diiodide, as colorless crystals, melting at 203–204 degree centigrade.

Analysis.—Calculated for $C_{12}H_{28}I_2N_2O_2$: C, 29.64; H, 5.81; I, 52.21. Found: C, 29.35; H, 5.78; I, 52.62.

In the examples, other compounds having different halogen anions can be prepared by substituting chlorine or bromine for the iodine at appropriate steps in the synthesis. Alternatively, the iodide can be converted to the chloride or bromide by transhalogenation using ion exchange resins in a conventional manner, or compounds having different non-halide anions can be prepared as shown in the following Examples 3 and 4.

Example 3

1-methyl-2-trimethylammonioethyl 3-trimethylammoniopropionate dipicrate

A solution of 1.3 grams (0.0027 mole) of 1-methyl-2-trimethylammonioethyl 3-trimethylammoniopropionate diiodide in ten milliliters of water was mixed with a solution of 2.3 grams (0.01 mole) of picric acid in 150 milliliters of water. The solution became turbid and gradually deposited canary yellow crystals. These were recrystallized from 200 milliliters of methanol to give 1.25 gram (68 percent of the theoretical yield) of 1-methyl-2-trimethylammonioethyl 3-trimethylammoniopropionate dipicrate, as yellow crystals, melting at 178–179 degrees centigrade.

Analysis.—Calculated for $C_{24}H_{32}N_8O_{16}$: C, 41.86; H, 4.68. Found: C, 42.05; H, 4.84.

Example 4

1-methyl-2-trimethylammonioethyl 3-trimethylammoniopropionate dinitrate

A solution of 1.0 gram (0.0021 mole) of 1-methyl-2-trimethylammonioethyl 3-trimethylammoniopropionate diiodide in twenty milliliters of water was treated with 0.7 gram (0.0042 mole) of silver nitrate in twenty milliliters of water. The silver iodide was filtered off and the filtrate concentrated to a colorless oil on the steam bath at reduced pressure. The oil, after two crystallizations from a mixture of absolute ethanol and ether, yielded 0.45 gram (61 percent of the theoretical yield) of slightly hygroscopic colorless crystals of 1-methyl-2-trimethylammonioethyl 3-trimethylammoniopropionate dinitrate, melting at 147–148 degrees centigrade.

Analysis.—Calculated for $C_{12}H_{28}N_4O_8$: C, 40.44; H, 7.92. Found: C, 40.42; H, 7.92.

Example 5

2-methyl-2-trimethylammoniopropyl 3-trimethylammoniopropionate diiodide

A mixture of 1.9 grams (0.0043 mole) of 2-methyl-2-trimethylammoniopropyl 3-iodopropionate iodide and one gram (0.017 mole) of trimethylamine in thirty milliliters of chloroform was shaken vigorously for two minutes, when the suspended solid changed to a clear, colorless oil. This oil crystallized after standing for ten minutes, and, after standing overnight at room temperature, was filtered and washed with chloroform. After recrystallization from 125 milliliters of methanol, there was obtained 1.6 grams (74 percent of the theoretical yield) of 2-methyl-2-trimethylammoniopropyl 3-trimethylammoniopropionate diiodide, as colorless crystals, melting at 222 degrees centigrade with decomposition.

Analysis.—Calculated for $C_{13}H_{30}I_2N_2O_2$: C, 31.21; H, 6.05. Found: C, 31.01; H, 5.88.

Example 6

2-trimethylammonioethyl 2-methyl-3-trimethylammoniopropionate diiodide

A solution of 5.68 grams (0.040 mole) of methyl iodide in five milliliters of acetone was added to a solution of 2.02 grams (0.010 mole) of 2-dimethylaminoethyl 3-dimethylamino-2-methylpropionate at a rate sufficient to moderate the exothermic reaction. The product precipitated as an oil, even in the presence of crystalline seed; crystallization began at fifteen minutes and appeared to be complete in one hour. After standing at room temperature for two days the product was filtered, washed well with acetone and dried at 78 degrees centigrade and 65 millimeters of mercury pressure absolute to a constant weight of 4.6 grams (95 percent of the theoretical yield) which softened at 155 degrees centigrade and melted at 160–164 degrees centigrade. After two recrystallizations from 25–50 percent methanol in acetone, there was obtained 3.71 grams of 2-trimethylammonioethyl 2-methyl-3 - trimethylammoniopropionate diiodide (73 percent of the theoretical yield) which softened at 165 degrees centigrade and melted at 167–170 degrees centigrade.

Analysis.—Calculated for $C_{12}H_{28}I_2N_2O_2 \cdot 0.5H_2O$: C, 29.11; H, 5.90; I, 51.26; $H_2O$, 1.82. Found: C, 28.96; H, 6.01; I, 51.40; $H_2O$, 1.6.

Example 7

2-(dethylmethylammonio)ethyl 3-(diethylmethylammonio)-2-methylpropionate diiodide A solution of 5.68 grams (0.040 mole) of methyl iodide in five milliliters of acetone was added slowly to a solution of 2.02 grams (0.010 mole) of 2-diethylaminoethyl 3-diethylamino-2-methylpropionate in twenty milliliters of acetone. The product precipitated as an oil, even in the presence of crystalline seed; crystallization began in thirty minutes and appeared to be complete in three hours. After standing at room temperature for two days the product was filtered, washed well with acetone and dried at 78 degrees centigrade at 65 millimeters of mercury pressure absolute to a constant weight of 4.48 grams (83 percent of the theoretical yield). After three recrystallizations from ten percent methanol in acetone, the yield was 1.46 grams (27 percent of the theoretical yield) of 2-(diethylmethylammonio)ethyl 3-(diethylmethylammonio)-2-methylpropionate diiodide, as moderately hygroscopic crystals which softened at 156 degrees centigrade and melted at 156.5–160 degrees centigrade. More product could be recovered from the mother liquors.

Analysis.—Calculated for $C_{16}H_{36}I_2N_2O_2$: C, 35.44; H, 6.69; I, 46.80. Found: C, 35.08; H, 5.98; I, 47.18.

In the manner of the foregoing examples, other lower-alkyl groups such as, for example, propyl, butyl, isobutyl, pentyl, et cetera may be substituted for the methyl and ethyl groups shown on the nitrogen atom; other anions for those shown may be substituted, as previously discussed; and other branched hydrocarbon chains containing up to six carbon atoms, such as, for example, 2-ethyl, 2-propyl, 3-butyl, et cetera, can be substituted.

Various modifications may be made in the present invention without departing from the spirit or scope thereof, and it is to be understood that we limit ourselves only as defined in the appended claims.

We claim:
1. A compound having the formula:

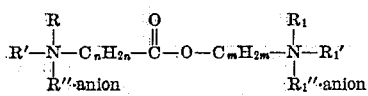

wherein R, R', R", R₁, R₁' and R₁" are lower-alkyl groups containing up to six carbon atoms, $n$ and $m$ are integers from one to six, inclusive, at least one of the alkylene groups selected from the group consisting of $-C_nH_{2n}-$ and $-C_mH_{2m}-$ representing a branched chain alkylene group, and the anions are non-toxic anions.

2. A compound having the formula:

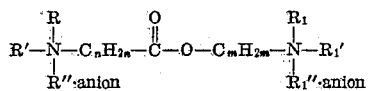

wherein R, R', R", R₁, R₁', and R₁" are lower-alkyl groups selected from the group consisting of methyl and ethyl, $n$ and $m$ are integers from one to six, inclusive, at least one of the alkylene groups selected from the group consisting of $-C_nH_{2n}-$ and $-C_mH_{2m}-$ representing a branched chain alkylene group, and the anions are non-toxic anions.

3. A compound having the formula:

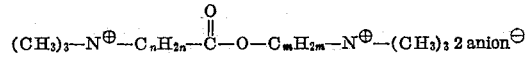

wherein $n$ and $m$ are integers from one to six inclusive, at least one of the alkylene groups selected from the group consisting of $-C_nH_{2n}-$ and $-C_mH_{2m}-$ representing a branched chain alkylene group, and the anions are nontoxic anions.

4. 2 - trimethylammoniobutyl 3 - trimethylammoniopropionate diiodide.

5. 1 - methyl - 2 - trimethylammonioethyl 3-trimethylammoniopropionate dinitrate.

6. 2 - methyl - 2 - trimethylammoniopropyl 3 - trimethylammoniopropionate diiodide.

7. 2 - trimethylammonioethyl 2 - methyl - 3 - trimethylammoniopropionate diiodide.

8. 2 - (diethylmethylammonio)ethyl 3 - (diethylmethylammonio)-2-methylpropionate diiodide.

References Cited in the file of this patent

Fusco et al.: Gass. Chim. Ital., v. 79 (1949), 836–48.
Schueler et al.: Science, v. 113 (1951), 512–4.
Fusco et al.: Chem. Abst., v. 47 (1953), 6865–6.
Schueler et al.: J. Am. Pharm. Assn., v. 43 (1954), 99.